US006409085B1

(12) United States Patent
Gu

(10) Patent No.: US 6,409,085 B1
(45) Date of Patent: Jun. 25, 2002

(54) METHOD OF RECOGNIZING PRODUCE ITEMS USING CHECKOUT FREQUENCY

(75) Inventor: Yeming Gu, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 98 days.

(21) Appl. No.: 09/640,032

(22) Filed: Aug. 16, 2000

(51) Int. Cl.7 .................... G06K 7/10
(52) U.S. Cl. .................... 235/462.11; 235/383
(58) Field of Search .................... 235/462.11, 383

(56) References Cited

U.S. PATENT DOCUMENTS 4,693,330 A 9/1987 Uchimura et al.
5,166,755 A 11/1992 Gat
5,253,302 A * 10/1993 Massen .................... 235/383
5,546,475 A 8/1996 Bolle et al.
5,867,265 A 2/1999 Thomas

* cited by examiner

*Primary Examiner*—Harold I. Pitts
(74) *Attorney, Agent, or Firm*—Paul W. Martin

(57) ABSTRACT

A method of recognizing produce items which uses checkout frequency as an a priori probability. The method includes the steps of collecting produce data from the produce item, determining DML values between the produce data and reference produce data for a plurality of types of produce items, determining conditional probability densities for all of the types of produce items using the DML values, combining the conditional probability densities together to form a combined conditional probability density, determining checkout frequencies for the produce types, determining probabilities for the types of produce items from the combined conditional probability density and the checkout frequencies, determining a number of candidate identifications from the probabilities, and identifying the produce item from the number candidate identifications.

7 Claims, 6 Drawing Sheets

METHOD OF RECOGNIZING PRODUCE ITEMS USING CHECKOUT FREQUENCY

CROSS-REFERENCE TO RELATED APPLICATIONS

The present invention is related to the following commonly assigned and co-pending U.S. application:

"A Produce Data Collector And A Produce Recognition System", filed Nov. 10, 1998, invented by Gu, and having a Ser. No. 09/189,783.

"System and Method of Recognizing Produce Items Using Probabilities Derived from Supplemental Information", filed Jul. 10, 2000, invented by Kerchner, and having a Ser. No. 09/612,682;

BACKGROUND OF THE INVENTION

The present invention relates to product checkout devices and more specifically to a method of recognizing produce items using checkout frequency.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce recognition system is disclosed in the cited co-pending application. A produce item is placed over a window in a produce data collector, the produce item is illuminated, and the spectrum of the diffuse reflected light from the produce item is measured. A terminal compares the spectrum to reference spectra in a library. The terminal determines candidate produce items and corresponding confidence levels and chooses the candidate with the highest confidence level. The terminal may additionally display the candidates for operator verification and selection.

Different produce items usually have very different checkout frequencies. Therefore, it would be desirable to supplement spectral data with checkout frequency information in order to improve the speed and accuracy of recognizing produce items.

SUMMARY OF THE INVENTION

In accordance with the teachings of the present invention, a method of recognizing produce items using checkout frequency is provided.

A method is proposed to utilize the checkout frequency as an a priori probability in a produce recognition system. No particular statistical model is assumed in applying Bayes Rule to calculate an a posteriori probability, which is used to rank candidate identifications for the produce item. A defined DML algorithm can provide a readily available method for computing conditional probability densities.

The method includes the steps of collecting produce data from the produce item, determining DML values between the produce data and reference produce data for a plurality of types of produce items, determining conditional probability densities for all of the types of produce items using the DML values, combining the conditional probability densities together to form a combined conditional probability density, determining checkout frequencies for the produce types, determining probabilities for the types of produce items from the combined conditional probability density and the checkout frequencies, determining a number of candidate identifications from the probabilities, and identifying the produce item from the number candidate identifications.

It is accordingly an object of the present invention to provide a method of recognizing produce items using checkout frequency.

It is another object of the present invention to reduce the time involved in processing produce items.

It is another object of the present invention to provide a more accurate list of candidate produce items to a checkout operator.

It is another object of the present invention to provide a method of recognizing produce items using checkout frequency to supplement data captured from the produce items.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
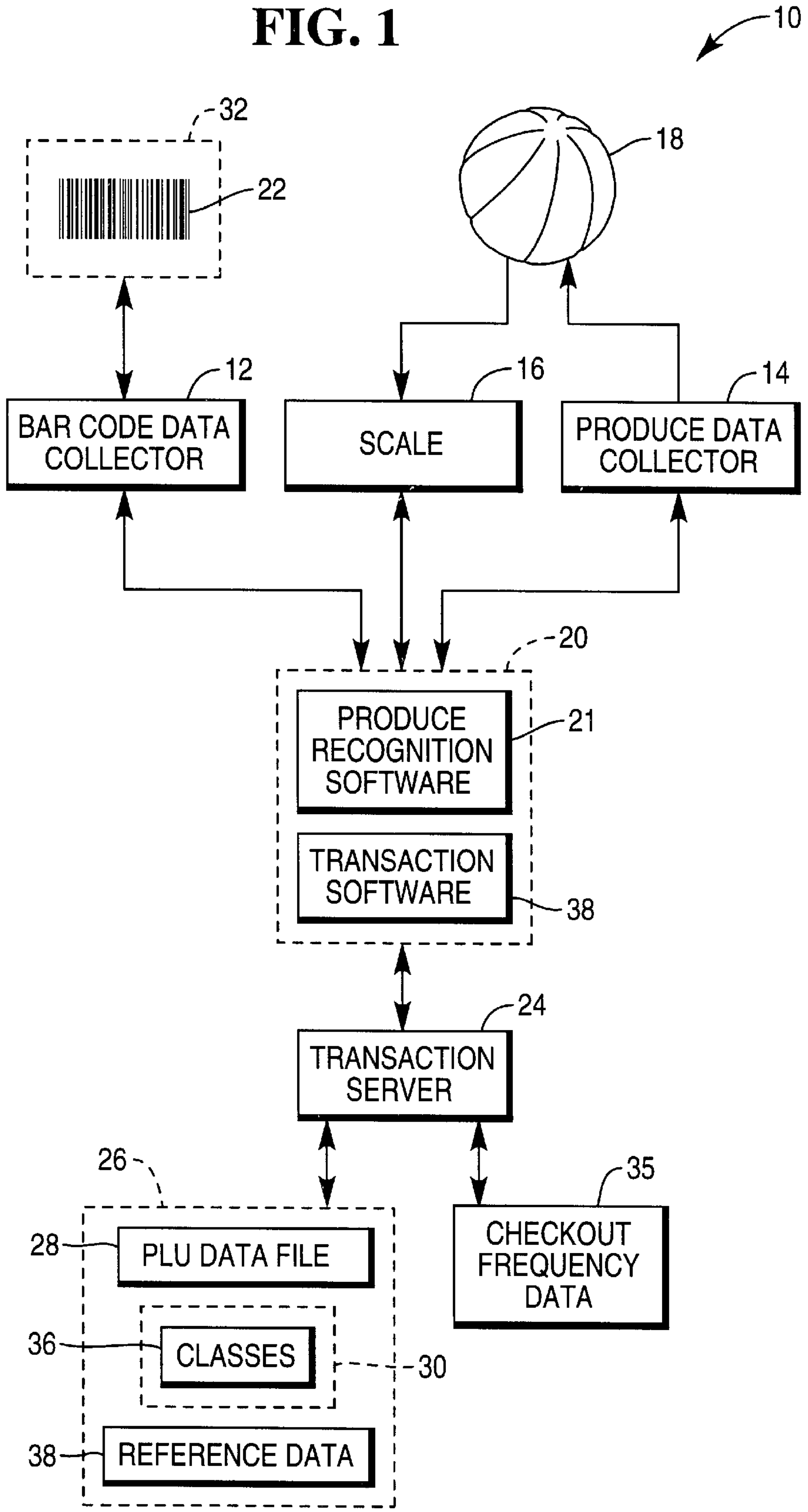
FIG. 1 is a block diagram of a transaction processing system.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Figure 2:
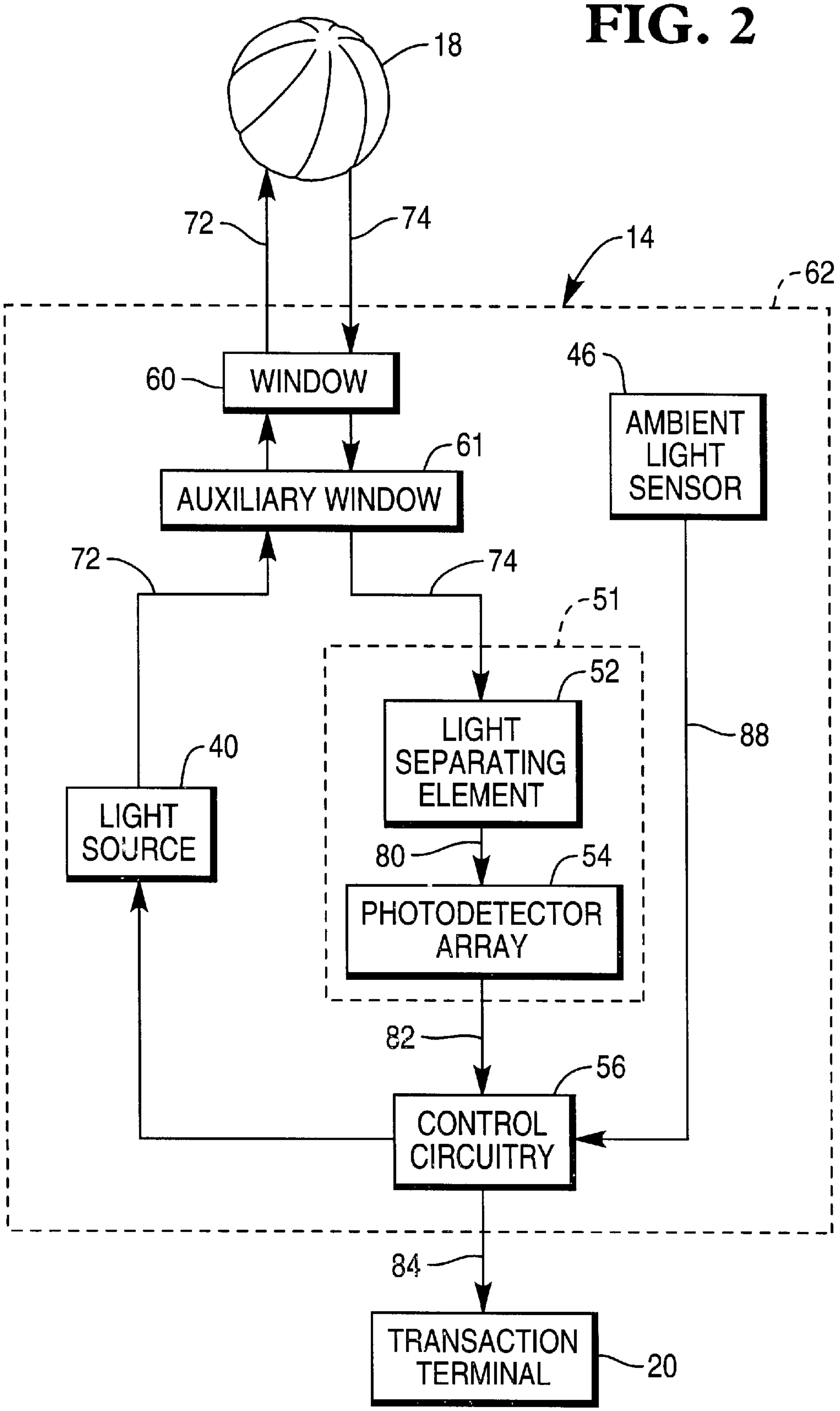
FIG. 2 is a block diagram of a produce data collector.
Figure 3:
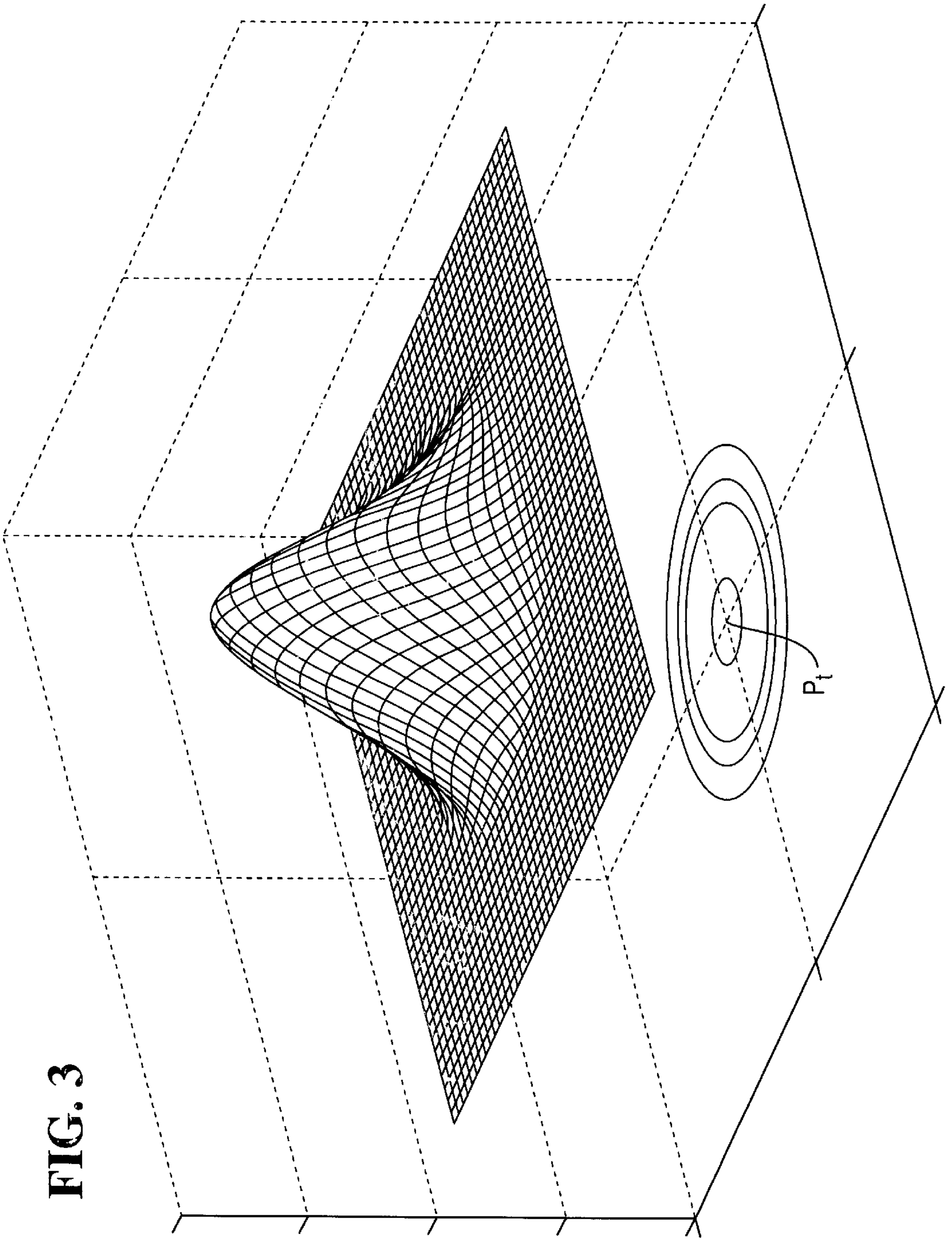
FIG. 3 is an illustration of a probability density distribution of random samples on a two-dimensional plane.

Produce data collector 14 collects spectral data for produce item 18. Produce data collector 14 preferably includes spectrometer 51 (FIG. 2)

Scale 16 collects weight data and may be integrated within bar code data collector 12.

Database 35 stores information such as checkout frequency information. Database 35 is accessible to transaction server 24 and may be stored within storage medium 26. Database 35 may alternatively be stored elsewhere, for example, at a centralized store management location. Alternatively, database 35 may be part of the classification library 30.

Classification library 30 contains reference data from previously collected and processed produce data.

Reference data 38 is device-dependent data for data reduction steps. For example, data 38 includes calibration information and pixel-to-wavelength mapping and interpolation information used in the data reduction process.

During a transaction, produce data collector 14 may be self-activated when produce item 18 blocks ambient light from entering window 60 (FIG. 2), or initiated by placement of produce item 18 on scale 16 or by operator commands.

Bar code data collector 12 and produce data collector 14 operate separately from each other, but may be integrated together. Bar code data collector 12 works in conjunction with transaction terminal 20 and transaction server 24.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains characteristics of produce item 18 from produce data collector 14, identifies produce item 18 by comparing produce data in classification library 30 with collected produce data, further refines the identification using checkout frequency information from database 35, retrieves an item identification number from classification library 30, and passes it to transaction software 25, which obtains a corresponding price from PLU data file 28.

In an alternative embodiment, identification of produce item 18 may be handled by transaction server 24. Following identification, transaction server 24 obtains a price for produce item 18 and forwards it to transaction terminal 20.

PLU data file 28 and produce data file 30 are stored within storage medium 26, but either may also be located instead at transaction terminal 20.

Checkout Frequency

Checkout frequency is the relative number of times an item is purchased. It can be established for a given location (store) in a given time period, or it can also be based on the average within a given region in a given time period. For example, for a particular store (or region), suppose that there are N different produce items sold, with the i-th item sold $n_i$ times. The checkout frequency for the $$f_i = \frac{n_i}{\sum_1^N n_i} \tag{1}$$

Checkout frequency may be established as a function of season or month of the year to better reflect the seasonal changes in availability and popularity of different produce items. An initial set of frequency data may be provided based on a national or regional average.

During its operation the produce recognition system will accumulate its own statistics over time and update a store-specific frequency database (or some form of localized database, e.g., the average based on a local chain of stores).

Checkout frequency may be used as a priori information in the Bayes decision theory. A list of known checkout frequencies would yield a ranking of the top choices.

For example, if bananas have a twenty percent checkout frequency, then a guess that an unknown item at the check-out lane is a banana would have a one in five probability to be correct.

As another example, If the twelve most popular produce items have a combined check-out frequency of sixty percent, then putting these items as the top twelve choices on the screen, one would get a first-screen choice accuracy of sixty percent on average.

Produce data collector 14 provides an array of measurements $$x=[x_1,x_2, \ldots x_p].$$

The conditional probability density function for x given the unknown item is $C_i$ may be denoted as $$P(x|C_i).$$

The probability for the unknown item to be $C_i$ (the a posteriori probability) is given by Bayes Rule, $$P(C_i|x) = \frac{p(x|C_i)f_i}{\sum_1^N p(x|C_i)f_i}. \tag{2}$$

This probability can be used to rank the possible choices of produce items.

For a given produce data library, the conditional probability density can be computed using a DML algorithm or other method, such as realistic probability estimation based on histograms.

Distance Measure of Likeness

Produce recognition software 21 uses a DML algorithm to compute the probability of an unknown object being of a given class $C_i$. Produce recognition software 21 compares DML values between an unknown instance of data and all classes 36 within library 30.

The DML algorithm allows the projection of any data type into a one-dimensional space, thus simplifying the multivariate conditional probability density function into an univariate function.

While the sum of squared difference (SSD) is the simplest measure of distance between an unknown instance and instances of known items, the distance between an unknown instance and a class of instances is most relevant to the identification of unknown instances. A distance measure of likeness (DML) value provides a distance between an unknown instance and a class, with the smallest DML value yielding the most likely candidate.

In more detail, each instance is a point in the N-dimensional space, where N is the number of parameters that are used to describe the instance. The distance between points $P_1(x_{11}, x_{21}, \ldots, x_{N1})$ and $P_2(x_{12}, x_{22}, \ldots, x_{N2})$ is defined $$d(P_1, P_2) = \sqrt{\sum_{i=1}^{N} (x_{i2} - x_{i1})^2}. \tag{3}$$

The distance between two instances, $d(P_1, P_2)$, measures how far apart the two instances are in the N-dimensional space. In the ideal case of well-defined classes 36, i.e., each class is represented by a single point in the N-dimensional space, produce identification is reduced to point matching: an instance P is identified as item j only if $d(P,P_j)=0$.

In reality, there are always measurement errors due to instrumental noise and other factors. No two items of the same class are identical, and for the same item, the color and appearance changes over its surface area. The variations of orientation and distance of produce item 18 relative to window 60 further affect the measurements. All these factors contribute to the spreading of instance data in the N-dimensional space.

In a supermarket, a large number of instance points are measured from all the items of a class. There are enough instances from all items for all instance points to be spread in a practically definable volume in the N-dimensional space or for the shape and size of this volume to completely characterize the appearances of all the items of the class. The shape of this volume may be regular, like a ball in three dimensions, and it may be quite irregular, like a dumbbell in three dimensions.

Now if the unknown instance P happens to be in the volume of a particular class, then it is likely to be identifiable as an item of the class. There is no certainty that instance P is identifiable as an item in the class because there might be other classes 36 with their volumes overlapping this volume. So instance P could be simultaneously in the volumes of several classes 36. Therefore, the simple distance measure $d(P_1, P_2)$ above is not the best identification tool for such cases, since a class is characterized by a volume in N-dimensional, not by points.

A class is not only best described in N-dimensional space, but also is best described statistically, i.e., each instance is a random event, and a class is a probability density distribution in a certain volume in N-dimensional space.

Figure 4:
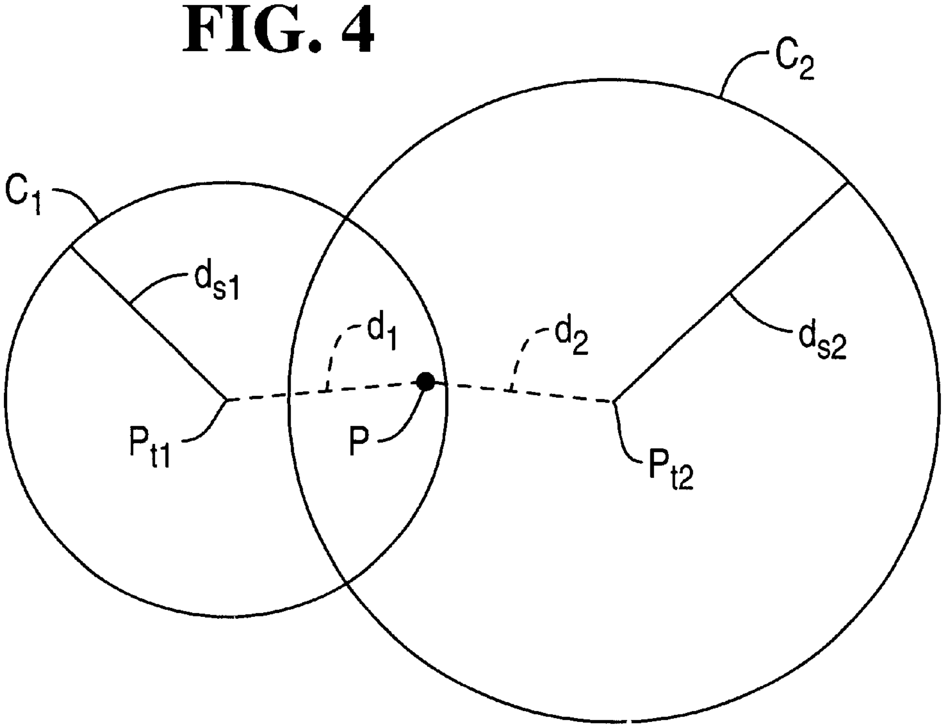
FIG. 4 is an illustration of symmetric two-dimensional probability density distributions for two classes.

As an example, consider randomly sampling items from a large number of items within the class "Garden Tomatoes". The items in this class have relatively well defined color and appearance: they are all red, but there are slight color variations from item to item, and even from side to side of the same item. However, compared to other classes 36, such as "Apples", there are much fewer item-to-item color variations. Since a typical tomato has a color which is "tomato red", a typical instance, $P_t$, associated with the typical tomato will be at or near the center of the N-dimensional volume of the class "Garden Tomatoes". Since items in the class have only slight color variations, most instances from a random sampling will be close to this typical instance $P_t$. Further away from instance $P_t$, fewer points will be found. Schematically this is illustrated in FIG. 4, where the probability density for finding a random event on the two-dimensional plane is plotted as a mesh surface and also contoured at the bottom of the figure. The falling-off of probability density for a given class can be verified by looking at the histogram of the distances between instance $P_t$ and all the instance points that are randomly sampled for the class.

It is difficult to imagine, much less to illustrate, the relative positions and overlapping of classes 36 in N-dimensional space, where N is larger than three. So the following discussion starts in two-dimensional space and extends to higher dimensions.

Figure 5:
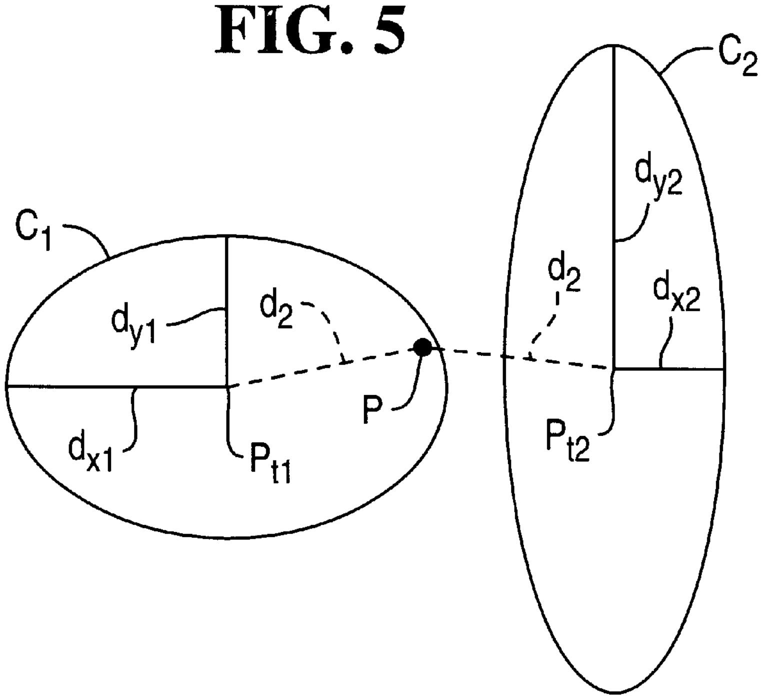
FIG. 5 is an illustration of asymmetric two-dimensional probability density distributions for two classes of produce items.

A first ideal example in two-dimensional space is shown in FIG. 5. This example assumes that each class can be represented by a symmetric probability distribution, i.e., all contour lines in FIG. 4 are circles. Without knowing the actual shape of the distribution function (e.g., whether it is Gaussian or non-Gaussian), the distribution can be characterized by a typical distance scale $d_s$, which is a radius of one of the contour lines in FIG. 4. It can be regarded as a distance from the typical instance beyond which the probability density is significantly lower than inside it.

An unknown instance P happens to be in the overlapping area of two classes $C_1$ and $C_2$. The unknown instance P could belong to either class. Using a simple distance measure does not help identify the likely class, since instance P is about equal distances $d_1$ and $d_2$ away from typical instances $P_{t1}$, and $P_{t2}$. However, under the assumption that the probability density is inversely proportional to distance relative to distance scale, instance P is more likely to belong to class $C_2$ than class $C_1$, since $$\frac{d_2}{d_{s2}} < \frac{d_1}{d_{s1}}. \qquad (4)$$

Relative to the respective distance scale, instance P is closer to the typical instance $P_{t2}$ of class $C_2$ than to the typical instance $P_{t1}$ of class $C_1$.

Figure 6:
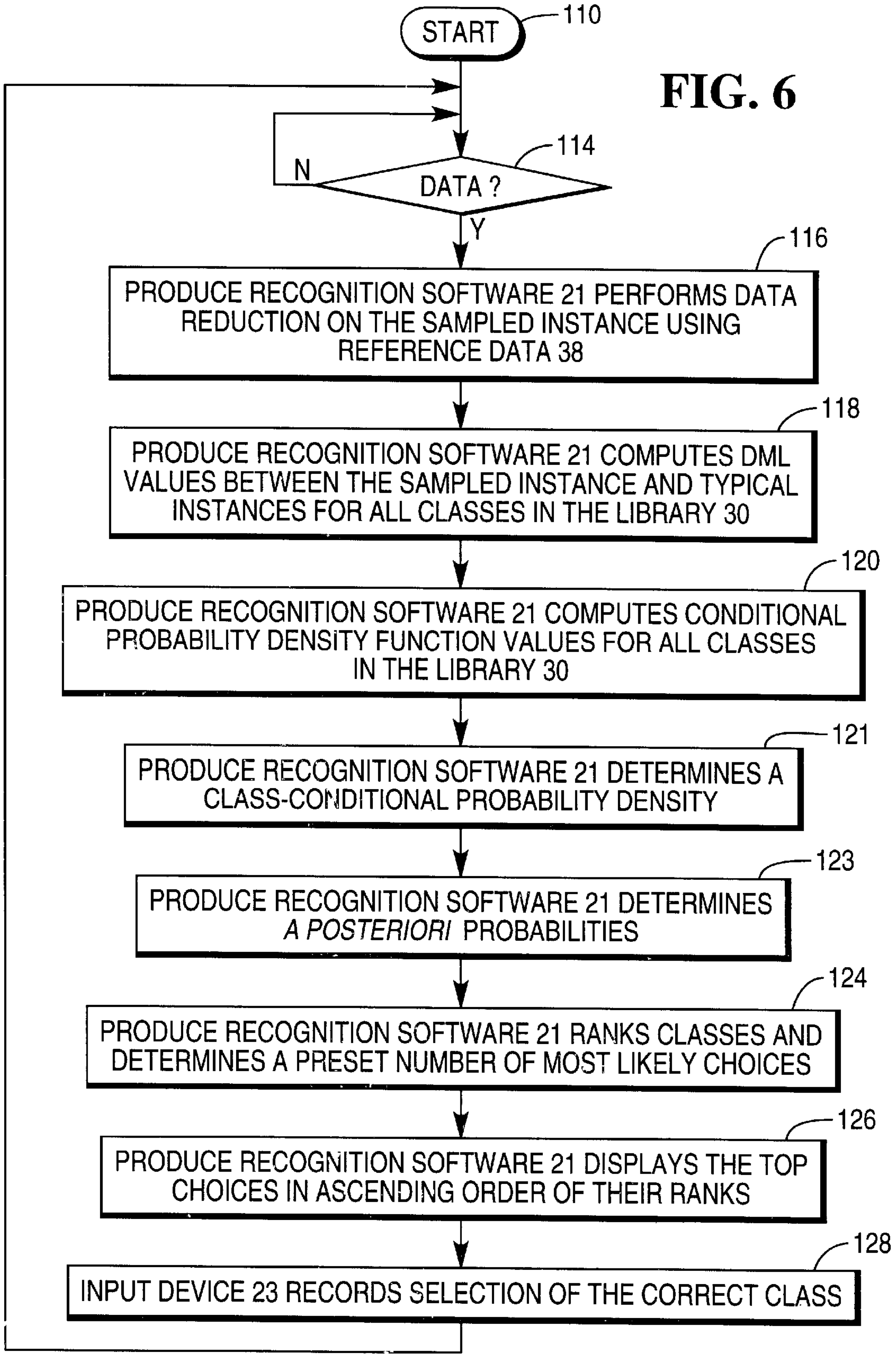
FIG. 6 is a flow diagram illustrating the produce recognition method of the present invention.

A second example in two-dimensional space is shown in FIG. 6. This example illustrates an asymmetric distribution, since the distribution may not always be symmetric. For example, if the distribution is due to measurement error, the error might be larger near the red end of the spectrum than the blue end. In fact, the intrinsic color variation of most classes 36 is non-uniform across the spectral range. For asymmetric distributions, a distance scale for the x- and y-dimensions must be defined.

Although the relative positions of $P_{t1}$, $P_{t2}$, and P are the same as in FIG. 5, the distribution of class $C_2$ is much narrower in x-dimension than the distribution of class $C_1$. Thus, instance P is much more likely to belong to class $C_1$ than class $C_2$.

A generalized distance measure for symmetric and asymmetric distributions in two-dimensional space is herein defined. This distance measure is a Distance Measure of Likeness (DML) for an unknown instance P(x, y) relative to a class $C_j$:

$$D_j = \sqrt{\frac{(x - x_{tj})^2}{d_{xj}^2} + \frac{(y - y_{tj})^2}{d_{yj}^2}}, \qquad (5)$$

where $P_{tj}(X_{tj}, Y_{tj})$ is a typical instance of class $C_j$, and $d_{xj}$ and $d_{yj}$ are typical distance scales for class $C_j$ in x- and y-dimensions, respectively.

The following DML definition is extended to N-dimensional space:

$$D_j = \sqrt{\sum_{i=1}^{N} \frac{(x_i - x_{tij})^2}{d_{ij}^2}}, \qquad (6)$$

where $P(x_1, x_2, \ldots, x_N)$ is an unknown instance, $P_{tj}(x_{t1j}, x_{t2j}, \ldots, x_{tNj})$ is a typical instance for the j-th class, $d_{ij}$ is the distance scale in the i-th dimension, and where $D_j$ is the distance measure between instance P and the class defined by typical instance $P_{tj}$ and the corresponding distance scales. In comparing unknown instance P with a library of typical instances $P_{tj}$, the class with the smallest DML value $D_j$ corresponds to the most likely identification.

Before a DML value may be calculated, the typical instance and the related distance scales must be determined.

If each class has a relatively well-defined color and the instance-to-instance variations are mostly random, then the typical instance is well approximated by the average instance:

$$P_{tj}(x_{t1j}, x_{t2j}, \dots, x_{tNj}) \approx \frac{\sum_{k=1}^{n_j} P_{jk}(x_{1jk}, x_{2jk}, \dots, x_{Njk})}{n_j}, \tag{7}$$

where each class in library 34 is represented by a large number of randomly sampled instances, each instance is measured by N parameters, $n_j$ is the number of instances in the j-th class, and the j-th class in library 34 is represented by a group of $n_j$ points in N-dimensional space:

$$P_{jk}(x_{1jk}, x_{2jk}, \dots, x_{Njk}),\ k=1,2, \dots, n_j. \tag{8}$$

Each instance point $P_{jk}$ is actually a vector, and the sum $$\sum_{k=1}^{n_j} P_{jk}(x_{1jk}, x_{2jk}, \dots, x_{Njk}) \tag{9}$$

is a vector sum. Thus, the distance scale for i-th dimension can be defined as the standard deviation of the i-th parameter:

$$DML \equiv d_{ij} = \sqrt{\sum_{k=1}^{n_j} \frac{(x_{ijk} - x_{tik})^2}{n_j - 1}}. \tag{10}$$

Class-conditional Probability Density Function

The conditional probability density function of the spectral data for a given class (containing classifiable items) can be modeled and computed using the DML distance value.

Captured spectral data is discrete data defined by many small wavelength bands. A spectrometer may record color information in dozens or even hundreds of wavelength bands. However, since diffuse reflection has a continuous and relatively smooth spectrum, about sixty equally-spaced wavelength bands in the 400–700 nm may be adequate. The optimal number of wavelength bands depends on the application requirement and the actual resolution of the spectrometer. Let's define $N_s$ as the number of spectral bands, i.e., there are $N_s$ discrete spectral components for each measurement.

Assuming that the spectral variation of the diffuse reflection from a given class of objects is due to intrinsic color variation and some relatively small measurement error, then for a given class, the DML value provides a distance measure in a $N_s$-dimensional space. If we model the conditional probability density with the multivariate normal density function, due to the definition of DML we have $$p(x|C_i) = \frac{1}{\sqrt{2\pi}} e^{\left(-\frac{1}{2}D_i^2\right)}; \tag{11}$$

where $D_i$ is the DML distance between two points in the $N_s$-dimensional space, with one point representing the typical instance, $x_{ti}$, as defined in the DML algorithm for the i-th class, $C_i$, and another point being an arbitrary point (or sampling vector), x, with $$D_i = \sqrt{\sum_{j=1}^{N_s} \frac{(x_j - x_{tij})^2}{d_{ij}^2}}; \tag{12}$$

This model is valid if all spectral components are statistically independent. This may not be true if the intrinsic color variation within the class is the dominant component, since the spectral curve is smooth and continuous, the variation of neighboring wavelength bands will most likely to be somewhat correlated.

A more general probability density may be established as a univariate function of the DML distance, such that $$p(x|C_i) = p(D_i). \tag{13}$$

For example, it could be established from the histogram (in $D_i$) of a large number of random samples for Class $C_i$.

While the above discussions are based on continuum spectral data, the DML algorithm and equations (12) & (13) can be applied to any other multivariate data types. Of course, it is also applicable to univariate cases.

Turning now to FIG. 2, an example produce data collector 14 is illustrated and primarily includes light source 40, ambient light sensor 46, spectrometer 51, control circuitry 56, transparent window 60, auxiliary transparent window 61, and housing 62.

Light source 40 produces light 70. Light source 40 preferably produces a white light spectral distribution, and preferably has a wavelength range from 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. The LEDs can be turned on and off very quickly, since it only takes less than two milliseconds for the LEDs to reach their stable output.

Ambient light sensor 46 senses the level of ambient light through windows 60 and 61 and sends ambient light level signals 88 to control circuitry 56. Ambient light sensor 46 is mounted anywhere within a direct view of window 61.

Spectrometer 51 includes light separating element 52 and detector 54.

Light separating element 52 splits light 76 in the preferred embodiment into light 80 of a continuous band of wavelengths. Light separating element 52 is preferably a linear variable filter (LVF), such as the one manufactured by Optical Coating Laboratory, Inc., or may be any other functionally equivalent component.

Detector 54 produces waveform signals 82 containing spectral data. The pixels of the array spatially sample the continuous band of wavelengths produced by light separating element 52, and produce a set of discrete signal levels. Detector 54 is preferably a photodiode array, or a complimentary metal oxide semiconductor (CMOS) array, but could also be a Charge Coupled Device (CCD) array. The typical integration time of detector 54 is anywhere between five and a few hundred milliseconds depending on the internal illumination level and the detector sensitivity, but is typically about fifty milliseconds. A shorter integration time is preferred for real-time operation.

Control circuitry 56 controls operation of produce data collector 14 and produces digitized produce data waveform signals 84. For this purpose, control circuitry 56 includes a processor, memory, and an analog-to-digital (A/D) converter. A twelve bit A/D converter with a sampling rate of 22–44 kHz produces acceptable results.

Control circuitry 56 also receives signals from ambient light sensor 46. In response to ambient light level signals 88, control circuitry 56 waits for ambient light levels to fall to a minimum level before turning on light source 40. Ambient light levels fall to a minimum level when produce item 18 covers window 60. After control circuitry 56 has received waveform signals 82 containing produce data, control circuitry 56 turns off light source 40 and waits for ambient light levels to increase. Ambient light levels increase after produce item 18 is removed from window 60.

Housing 62 contains light source 40, ambient light sensor 46, spectrometer 51, control circuitry 56, and auxiliary transparent window 61. Housing 62 additionally contains transparent window 60 when produce data collector 14 is a self-contained unit. When produce data collector 14 is mounted within the housing of a combination bar code reader and scale, window 60 may be located in a scale weigh plate instead.

Transparent window 60 is mounted above auxiliary transparent window 61. Windows 60 and 61 include an anti-reflective surface coating to prevent light 72 reflected from windows 60 and 61 from contaminating reflected light 74.

In operation, light source 40 is turned off during the wait or idle state. An operator places produce item 18 on window 60. Control circuitry 56 senses placement and takes a reading from detector array 54. This is the real-time system dark level plus any ambient light leakage. Control circuitry then turns light source 40 on to illuminate produce item 18 and takes a spectral reading of the diffuse reflection from the item.

In the reading process, control circuitry 56 starts integration by detector array 54. Light separating element 52 separates reflected light 74 into different wavelengths to produce light 80 of a continuous band of wavelengths. Detector 54 produces waveform signals 82. Control circuitry 56 digitizes the analog reading into digital signal. The digital data may be hold in temporary on-board storage space or sent to the transaction terminal 20.

In a preferred configuration, the on-board processor in control circuitry 56 subtracts the first reading (system dark level with ambient light leakage) from the second reading (spectral reading with LED's on) to produce digitized produce data signals 84 which it sends to transaction terminal 20 for identification by produce recognition software 21. Control circuitry 56 turns off light source 40 and waits for the next produce item. Alternatively, both readings may be sent to transaction terminal 20 and the subtraction is performed by produce recognition software 21.

Transaction terminal 20 uses produce data in digitized produce data signals 84 and supplemental probabilities to identify produce item 18. After identification, transaction terminal 20 obtains a unit price from PLU data file 28 and a weight from scale 16 in order to calculate a total cost of produce item 18. Transaction terminal 20 enters the total cost into the transaction.

Turning now to FIG. 6, the produce recognition method of the present invention begins with START 110.

In step 114, produce recognition software 21 waits for spectral data from produce data collector 14. Operation proceeds to step 116 following produce data collection.

Figure 7:
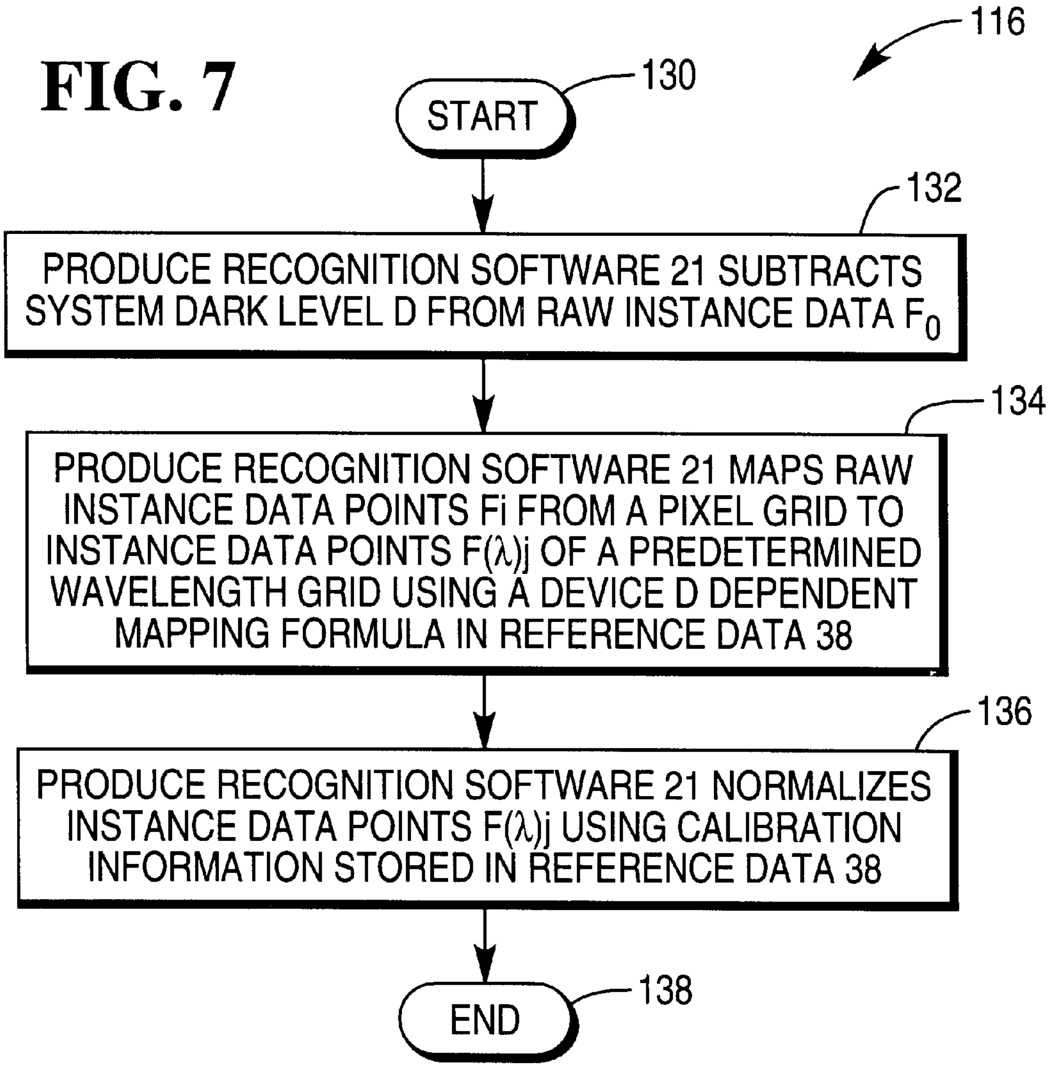
FIG. 7 is a flow diagram illustrating data reduction procedures.

In step 116, produce recognition software 21 performs data reduction on the sampled instance (FIG. 7).

In step 118, produce recognition software 21 computes DML values between the sampled instance and typical instances for all classes 36 in library 30.

In step 120, produce recognition software 21 computes conditional probability densities for each class 36 using the DML values.

In step 121, produce recognition software 21 combines the conditional probability densities to produce a class-conditional probability density.

In step 123, produce recognition software determines a posteriori probabilities for each class, i.e., that produce item 18 belongs to a any given class 36, from the class-conditional probability density and checkout frequency data from database 35 using Bayes rule.

In step 124, produce recognition software 21 ranks classes 36 and determines a predetermined number of most likely choices.

In step 126, produce recognition software 21 displays the number of likely choices in order of their ranks.

In step 128, produce recognition software 21 records an operator choice for produce item 18 through touch screen 23. Transaction terminal 20 uses the identification information to obtain a unit price for produce item 18 from transaction server 24. Transaction terminal 20 then determines a total price by multiplying the unit price by weight information from scale 34. Operation returns to step 114 to prepare for another produce item.

Turning to FIG. 8, a data reduction method used to build produce library 30 and process produce data during a transaction is illustrated beginning with START 130.

In step 132, produce recognition software 21 optionally subtracts the system dark level D from the raw instance data $F_0$. Dark level D is the spectral reading from produce data collector 14 with LED's off and window 60 covered by the produce item 18. This step may be completed by the control circuitry 56.

In step 134, produce recognition software 21 maps raw instance data points $F_i$ from a pixel grid to instance data points $F(\lambda)_j$ of a predetermined wavelength grid (e.g., 400 nm to 700 nm over 5 nm intervals) using a device-dependent mapping formula in reference data 38:

$$\{F_i,\ i=1, N_p\}\rightarrow\{F(\lambda_j),\ j=1, N_\lambda,$$

where $N_p$ is the number of pixels in the detector array 54 and $N_\lambda$ is the number of preset wavelengths. The device-dependent mapping formula is stored in reference data 38. For an LVF spectrometer, the device-dependent mapping formula is in the form $$\lambda=C_0+C_1xx$$

where $C_0$ and $C_1$ are two constant factors, and x is the pixel index.

In step 136, produce recognition software 21 normalizes instance data points $F(\lambda_j)$using calibration information stored in reference data 38.

Calibration information includes reference spectrum $F_{ref}(\lambda)$ which is measured at various times throughout the operating life of produce data collector 14 using an external reference:

$$F_n(\lambda)=\frac{F(\lambda)}{F_{ref}(\lambda)},$$

where $F_n(\lambda)$ is the normalized data.

Calibration information may also include a correction factor $C_{dev}(\lambda)$, if instead, produce data collector 14 uses an internal reference and measures an internal reference spectrum $F'_{ref}(\lambda)$ $$F_n(\lambda) = \frac{F(\lambda)}{C_{dev}F'_{ref}(\lambda)}.$$

In step 138, the process ends.

Although the invention has been described with particular reference to certain preferred embodiments thereof, variations and modifications of the present invention can be effected within the spirit and scope of the following claims.

I claim:

1. A method of identifying a produce item comprising the steps of:

(a) collecting produce data from the produce item;

(b) determining DML values between the produce data and reference produce data for a plurality of types of produce items;

(c) determining conditional probability densities for all of the types of produce items using the DML values;

(d) combining the conditional probability densities together to form a combined conditional probability density;

(e) determining checkout frequencies for the produce types;

(f) determining probabilities for the types of produce items from the combined conditional probability density and the checkout frequencies;

(f) determining a number of candidate identifications from the probabilities; and (g) identifying the produce item from the number candidate identifications.

2. The method as recited in claim 1, wherein step (g) comprises the substeps of:

(g-1) displaying the candidate identifications;

and (g-2) recording an operator selection of one of the candidate identifications.

3. The method as recited in claim 1, wherein step (a) comprises the substep of:

collecting spectral data.

4. A method of identifying a produce item comprising the steps of:

(a) collecting produce data from the produce item;

(b) determining DML values between the produce data and reference produce data for a plurality of types of produce items;

(c) determining conditional probability densities for all of the types of produce items using the DML values;

(d) combining the conditional probability densities together to form a combined conditional probability density;

(e) determining checkout frequencies for the produce types;

(f) determining probabilities for the types of produce items from the combined conditional probability density and the checkout frequencies;

(g) determining a number of candidate identifications from the probabilities;

(h) displaying the candidate identifications; and (i) recording an operator selection of one of the candidate identifications.

5. A produce recognition system comprising:

a number of sources of produce data for a produce item; and a computer system which determines DML values between the produce data and reference produce data for a plurality of types of produce items, determines conditional probability densities for all of the types of produce items using the DML values, combines the conditional probability densities together to form a combined conditional probability density, determines checkout frequencies for the produce types, determines probabilities for the types of produce items from the combined conditional probability density and the checkout frequencies, determines a number of candidate identifications from the probabilities, and identifies the produce item from the number candidate identifications.

6. The system as recited in claim 5, wherein the computer system displays the candidate identifications and records an operator selection of one of the candidate identifications.

7. The system as recited in claim 6, wherein one of the sources comprises a spectrometer.

* * * * *